Oct. 11, 1932.　　　　A. A. EWALD　　　　1,882,215

PRESSURE REGULATING TIRE INFLATING NOZZLE

Filed Feb. 23, 1929

INVENTOR.
Arno A. Ewald
BY
ATTORNEYS

Patented Oct. 11, 1932

1,882,215

UNITED STATES PATENT OFFICE

ARNO A. EWALD, OF OAKFIELD, WISCONSIN, ASSIGNOR TO ROMORT MANUFACTURING COMPANY OF OAKFIELD, WISCONSIN

PRESSURE-REGULATING TIRE-INFLATING NOZZLE

Application filed February 23, 1929. Serial No. 342,211.

My invention relates to improvements in pressure-regulating tire-inflating nozzles.

The primary object of my invention is to provide a form of nozzle through which air may be delivered by a pumping action and with a rapidity nearly equal to the capacity of the tire nipple to receive it, and maintain such rapid delivery until a predetermined desired pressure has been attained within the tire, whereupon the valve will automatically close to prevent further delivery.

More particularly stated, it is my object to provide a nozzle valve mechanism which will co-operate with the valve within a tire nipple in such a manner as to pump quantities of air into the tire from a reservoir within the nozzle which is being constantly refilled by air under a predetermined pressure in excess of the desired pressure at which the tire is to be inflated. A further object of my invention is to provide a tire-inflator nozzle having a signal-producing vibratory member which will not materially reduce the rate of air delivery during the initial stages of a filling operation, and which will accelerate the rate of air delivery during the final stages, and abruptly stop such delivery when the required degree of pressure is attained within the tire.

In the drawing.

Like parts are identified by the same reference characters in both views.

Figure 1:
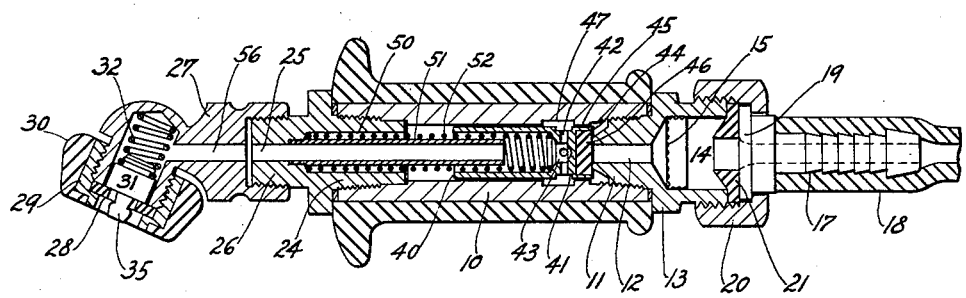
Figure 1 is a longitudinal sectional view of a tire-inflating nozzle embodying my invention showing the valve in its closed position.
Figure 2:
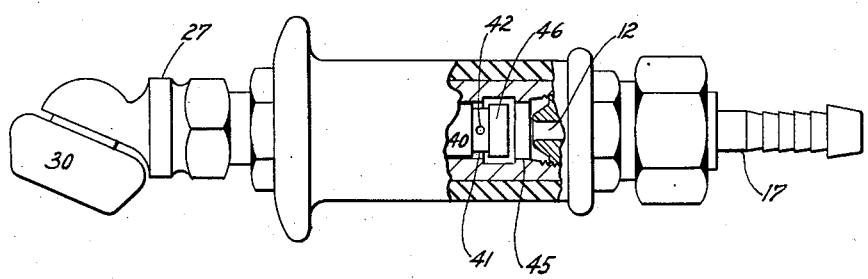
Figure 2 is a side view of the same with parts broken away and showing the valve in its open position.

A casing 10 of a generally cylindrical form is internally threaded at one end to receive a threaded plug 11 having a bore 12 and an enlarged exterior portion 13 which is provided with a cavity 14 in which a strainer 15 is preferably mounted. A tubular nipple 17 is formed to receive the end of a supply hose 18, and at its inner end is provided with a flange 19 to facilitate coupling it to the member 13 by a coupling nut 20, with an apertured packing disc 21 interposed between the flange 19 and the otherwise free end of the member 13 to which the nut 20 is screwed.

A plug 24, similar in form to the plug 13 and having a longitudinal bore 25, is screwed into the opposite end of cylinder 10, and provided with a threaded outer end portion 26 upon which the nozzle head 27 may be screwed. This nozzle head is provided with an apertured valve seat 28 which is held in position by a nut or fitting 29 having the usual rubber covering 30. Interiorly the head is provided with a valve 31, normally seated against the disc 29 by a spring 32, but which may be forced to open position by a projection 35 which extends through the aperture in the valve disc 28 and is enlarged in one direction or provided with a flattened knob to engage the end of a tire nipple, whereby, when pressed against the end of the nipple, the valve 31 may be held open during the filling operation.

Within the cylinder 10 there is mounted a cup-shaped plunger-like valve stem 40 which is reduced near its closed end to form a neck portion 41. This neck portion is provided with transversely extended apertures 42 which communicate with a cavity 43, whereby the air may pass to the interior and through the cup. The closed end 44 of the cup normally serves as a combined piston and valve within the portion 45 of the cylinder 10, its extremity being provided with a socket which receives a fiber disc 46 adapted to seat against the inner end of the apertured plug 11 to close the passage 12.

An annular channel or lateral recess 47, cut in the inner face of the cylinder 10, is normally in registry with the transverse passages or ports 42 in the neck portion of the plunger, and when valve disc 46 is pressed open by the air in passage 12, the slide valve 44 will prevent material flow until the plunger has been moved to a point where the seating face of the portion 44 is in full registry with the channel 47. The channel or recess 47 allows air to pass around the piston 44, whereby air from the source of supply may flow through the recess from the inlet port 12 to the ports 42 after the valve has opened to a point where the seating face 46 registers with the recess 47. It also allows the air pressure to substantially equalize on the inlet and outlet sides of the piston.

The plug 24 is provided with a spring socket 50. A tube 51 is screwed into the plug at the base of this socket, and projects into the cup-shaped valve stem 40, this tube forming a support for a coiled spring 52 which urges the valve 46 to its seat. The tube 51 also allows air to flow from the interior of the valve plunger 40 to the bore 25, which connects with a corresponding bore 56 in the nozzle head or outlet member 27.

The tube 51, the bore 25 and the registering bore 56 in the nozzle head may be of substantially the same diameter as the inlet port 12 but they form an outlet passage of greater length than said inlet port 12, and the quick opening movement of the valve plunger 46 effectively builds up the pressure on the outlet side of this valve to drive air through the outlet port under considerably increased pressure and momentum. Simultaneously, this increased pressure, in cooperation with the spring 52, drives the valve to its seat while the flow of air around the valve is building up additional pressure on the outlet side. It is probable that the momentum of the valve in both directions contributes to its rapid vibratory movement and its effectiveness in compression during its opening stroke.

The operation of the device is as follows:

Air is delivered through the hose 18 under pressure which is predetermined, preferably at about forty pounds in excess of the desired pressure within the tire to be filled. Pressure reducing means controlling delivery from a high pressure tank for so regulating the air pressure within the hose are disclosed in my former application, Serial #245,329, filed January, 1929, and somewhat similar means are disclosed in Letters Patent to W. A. Harris, #1,615,659, dated February 1, 1927.

The air delivered through the hose, forces valve 46 open against the pressure of the spring 52 and delivers air to the head 27 as soon as the valve 46 has opened far enough to allow air to enter the annular channel 47.

As soon as the pressure has built up within cylinder 10 to such an extent that the combined pressure of the air and the spring 52 will overcome the pressure of the air entering through the passage 12, the valve 46 will be again forced to its seat. The annular cavity around the valve seat will, of course, be full of air at a pressure at least equal to that in the hose and the valve does not seat tightly enough to prevent the pressure of the air from being exerted over its entire area.

Thereupon, if the head 27 is applied to a tire nipple in the usual manner, and sufficient manual pressure exerted, the end of the nipple will engage the flattened head 35 and force the valve 31 open, whereupon, the air in the nozzle will be permitted to flow into the tire, assuming its pressure is sufficient to open the valve 60 in the tire nipple 61. The pressure will then be reduced within the cylinder 10 to a point where the air pressure on the outer side of valve 46 will again open it.

During its opening movement, this valve and the associated plunger 40 will compress the previously delivered air and force a portion of it past the tire nipple valve 60 followed by an additional flow of air to the cylinder 10, as soon as valve 46 registers with the channel 47. This additional flow of air will immediately build up the pressure within cylinder 10 sufficiently to enable the spring 52 to again close the valve 46.

In the meantime, the pressure within the cylinder 10 will become substantially equalized with that within the tire, whereupon valve 46 will again be opened. These operations will be repeated with such rapidity that substantially all the air delivered to the tire will be driven past the tire nipple valve with a pumping action and under pressure exerted by the valve 46. In practice its delivery to the tire is accomplished with almost the same rapidity as if an open nozzle were employed.

The reciprocating action of the piston valve 44 may be further explained as follows. When the fibrous seating face 46 is in engagement with the tapered end of the ported plug 11, the inlet passage or port 12 is closed, but when air under sufficient pressure is supplied to this inlet passage 12 the valve leaves its seat, and as it moves outwardly the air from the port 12 enters the cylindrical bore 45 and exerts its pressure over the entire seating face of the valve to drive the same forwardly through the bore 45 as a piston which not only compresses the spring 52, but also drives the air before it into the tubular passage 25. The pressure of the air on the outlet side of the valve is thus increased and its inertia is overcome. As soon as the seating face of the piston valve registers with the recess 47, the pressure equalizes on both sides of the marginal portion of the piston valve 44. The air which thus passes the valve then begins to flow through the ports 42, whereupon the pressure on both sides of the piston 44 is so nearly equalized that the recoil of the spring 52 drives the valve backwardly in the direction of its seat with a quick positive stroke. When the valve again enters the bore 45 on this return stroke, it cuts off the supply from port 12, and by the time it reaches its seat sufficient air on the outlet side has been delivered to the tire to allow the pressure to drop on that side to a point where the air in the port 12 can again force the valve from its seat. This will continue until the desired pressure in the tire and in the outlet port 25 is attained, whereupon this counter-pressure and the spring 52 will be sufficient to hold the valve to its seat against the pressure in the port 12.

It is of considerable importance that the piston valve is adapted to serve as a pump piston to drive the air before it on the outlet side before the supply air is allowed to pass the valve from the port 12, and it is also of considerable importance that on the return stroke the valve shall operate as a piston to check the violence of its return and prevent it from striking the seat with destructive force.

The valve 46 will continue to vibrate with substantially uniform rapidity until the desired tire pressure is attained, whereupon the reaction pressure in the cylinder 10 will become sufficient when added to the spring pressure, to hold the valve in the closed position, thus automatically stopping further delivery. The vibration of valve 46 can be felt in the hand of the operator and it can also be heard. Therefore, the cessation of these signals notifies the operator that the tire has been filled.

The passages through the nozzle, including that of the passage 12 and ports 42, will preferably have a capacity somewhat greater than the opening around the valve in the tire nipple, whereby the full pressure within the nozzle passages may be exerted at the tire nipple valve, and owing to the rapid pumping action of the nozzle valve 46, the flow of air past the nipple valve will be substantially continuous. In practice, the passage 12 is made approximately three-sixteenths of an inch in diameter, and the total capacity of the nozzle space on the outlet side of the valve 46 is such that the opening movement of the valve will materially reduce this capacity with a corresponding reduction in volume and increase in pressure, of the air contained therein.

I claim:

1. A pumping nozzle for air delivery, comprising the combination of a ported nozzle chamber provided with a cylindrical plunger in slide valve relation to the walls of the chamber, and check valve relation to the inlet port, in combination with a spring arranged to urge the valve toward its seat with less pressure than that of the air at the inlet, said nozzle chamber having a recessed enlargement at a sufficient distance from the inlet port to allow an air compressing traverse in the direction of the outlet, said enlargement being adapted to allow substantial equalization of air pressure upon both sides of a piston in registry therewith.

2. A pumping nozzle for air delivery through a constricted opening, comprising the combination of a nozzle chamber having inlet and outlet ports and a nozzle head for delivery of air from the outlet port, a reciprocatory plunger within said chamber in slide valve relation to the chamber walls and check valve relation to the inlet port, said plunger and a portion of the chamber walls being formed in substantially air tight relation to each other and another portion of the plunger and chamber walls being formed to permit a free flow of air from the inlet port past the plunger after material traverse of the plunger in its opening movement.

3. A pumping nozzle for air delivery to valved tire nipples, comprising the combination of a nozzle chamber provided with inlet and outlet ports in its respective ends and a spring actuated cylindrical valve in said chamber normally closing the inlet port, said valve and chamber being formed in sliding fit relation to the cylinder for a portion of the valve traverse, whereby to require a compressing movement of the valve against the air in the chamber before allowing entry of additional air from the inlet port to the outlet portion of the chamber beyond the valve, the outlet being sufficiently restricted to allow a valve seating pressure to build up therein, whereby the valve may be rapidly vibrated to pump the air at the outlet side through the outlet under greater pressure than would be permitted if the flow of air were continuous therethrough.

4. A pumping nozzle for air delivery to valved tire nipples, comprising the combination of a cylindrical nozzle chamber provided with inlet and outlet ports and an intermediate enlargement of its internal diameter, a spring actuated plunger having one end normally in check valve relation to the inlet port and normally filling the chamber between the inlet port and said enlargement, said plunger being adapted to move, under pressure of air in the inlet port and in compressing relation to the air in said chamber, to a position allowing air from the inlet port to enter said enlargement of the chamber cavity, whereby the plunger may serve as a check valve, a slide valve and a pumping member to force air through the chamber outlet while admitting air to the chamber from the inlet.

5. A pumping nozzle for air delivery, comprising the combination of a casing having inlet and outlet ports at its respective ends, and an intermediate cylindrical barrel, a valve normally controlling air admission through the inlet port and provided with a cup shaped guide slidingly mounted in said barrel, and a compression spring interposed between the valve and the outlet portion of the casing in a position to urge the valve toward the inlet seat, said valve being cylindrical and adapted to substantially fit the barrel, and said barrel being provided with an enlargement positioned and adapted to serve as a passage around the valve during a portion of the opening movement thereof.

6. A pumping nozzle for air delivery, comprising the combination of a cylindrical casing having inlet and outlet ports at its respective ends, a cylindrical valve formed to slide within the casing and normally closing the inlet port, said valve having a cup shaped guide also fitted to slide within the casing, said guide having an open end facing the outlet port and being also provided with lateral openings adjacent to the valve, and said casing having a recess normally in registry with said openings and adapted to allow air to pass around the valve to said openings during the latter part of the valve opening movement.

7. A pumping nozzle for accelerating air delivery to valved tire nipples, comprising the combination of a nozzle chamber provided with inlet and outlet ports in its respective ends, and a tubular outlet member within said chamber affording communication with the outlet port from the interior of the chamber, a spring actuated cylindrical valve in said chamber normally closing the inlet port and arranged in piston fit relation to the chamber wall, said chamber having an air passage adapted to allow air to pass the valve to the outlet after the valve has moved from the inlet sufficiently to materially compress the air on the outlet side and drive it through said tubular outlet member, said spring having sufficient tension in cooperation with said compressed air to drive the valve in the direction of its seat with force to overcome the pressure of the air coming through the inlet, whereby a rapid pumping action is set up for driving air through the outlet under pressure greater than would otherwise be permissible.

8. In a pumping nozzle for air delivery to valved tire nipples, the combination of a nozzle chamber provided with inlet and outlet ports and a tubular outlet member projecting inwardly from the outlet port in the direction of the inlet, a spring actuated piston in said chamber adapted to serve as a valve normally closing the inlet port, said chamber being formed with an air passage adapted to allow air to pass to said outlet member after a substantial movement of said piston from its seat, and said spring being adapted in cooperation with air at maximum pressure on the outlet side to drive the piston to its seat at the inlet.

9. A pumping delivery nozzle for use with tire inflating apparatus, comprising a pump cylinder having inlet and outlet ports at its respective ends and an intermediate recess in its wall at a substantial distance from the inlet port, a piston-like valve reciprocable in said cylinder in sliding fit relation to the cylinder wall between the inlet port and said recess and in seating relation to the wall of the inlet port, a spring adapted to urge the piston toward seating position, and means for delivering air under pressure through the inlet port to actuate the piston in opposition to the spring until the air is delivered into said recess, said recess affording communication with the outlet port and also allowing air pressure to substantially equalize on opposite sides of the piston when the latter is in registry with the recess.

10. In a pumping air delivery nozzle adapted for use with tire inflating apparatus, the combination of a chamber provided with axially disposed inlet and outlet ports and a valve seat adjacent said inlet port, said chamber having a cylindrical wall adjacent said inlet port, of an air compressing piston having a face adapted at one end of its stroke to contact said seat and close said inlet port and having a peripheral wall adapted to contact said cylindrical wall of said chamber in substantially air-tight relation, said piston at the other end of its stroke being moved away from said seat and also out of contact with said cylindrical wall of said chamber to allow air to pass the piston from the inlet to the outlet port, and a spring for urging the piston toward the inlet port.

ARNO A. EWALD.